United States Patent
Saito et al.

(10) Patent No.: US 8,006,000 B2
(45) Date of Patent: Aug. 23, 2011

(54) BRIDGE, PROCESSOR UNIT, INFORMATION PROCESSING APPARATUS, AND ACCESS CONTROL METHOD

(75) Inventors: Hideyuki Saito, Tokyo (JP); Takeshi Yamazaki, Yokohama (JP); Yuji Takahashi, Tokyo (JP); Hideki Mitsubayashi, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 158 days.

(21) Appl. No.: 11/914,170

(22) PCT Filed: Jan. 11, 2007

(86) PCT No.: PCT/JP2007/050265
§ 371 (c)(1),
(2), (4) Date: Jan. 7, 2009

(87) PCT Pub. No.: WO2007/129482
PCT Pub. Date: Nov. 15, 2007

(65) Prior Publication Data
US 2009/0216921 A1     Aug. 27, 2009

(30) Foreign Application Priority Data

Apr. 6, 2006   (JP) .................................. 2006-105735
Apr. 26, 2006  (JP) .................................. 2006-121900

(51) Int. Cl.
G06F 13/28   (2006.01)
G06F 3/00    (2006.01)
G06F 5/00    (2006.01)
G06F 13/00   (2006.01)

(52) U.S. Cl. ............... 710/23; 710/39; 710/36; 710/107
(58) Field of Classification Search ................. 710/39, 710/23, 36, 107
See application file for complete search history.

(56) References Cited

U.S. PATENT DOCUMENTS 5,890,220 A    3/1999   Mochida et al.
(Continued)

FOREIGN PATENT DOCUMENTS

EP    1 271 327    1/2003
(Continued)

OTHER PUBLICATIONS

International Preliminary Report on Patentability, and English translation thereof, dated Nov. 17, 2008 from the corresponding PCT/JP2007/050265.

(Continued)

Primary Examiner — Alford W Kindred
Assistant Examiner — Farley Abad
(74) Attorney, Agent, or Firm — Katten Muchin Rosenman LLP (57) ABSTRACT

There is provided a technique of accessing a memory of a processor from a peripheral device, thereby the security is ensured while efficiency is being pursued. An address converter 14 includes an address conversion table for converting an effective address into a physical address. The address conversion table stores the effective address to which an area in a memory of a processor unit 10 is allocated to each peripheral device 30 and identification information of an access source to which access permission is given, in association with each other. When the peripheral device 30 accesses, the address converter 14 determines to permit access to the effective address under the condition that the device identification information, included in an access request packet, by which the peripheral device 30 can be uniquely identified, matches the identification information of the access source corresponding to the effective address, in the address conversion table, designated by the access request packet.

8 Claims, 4 Drawing Sheets

U.S. PATENT DOCUMENTS

| | | |
|---|---|---|
| 6,128,684 A | 10/2000 | Okayama |
| 6,839,777 B1 | 1/2005 | Vrancic et al. |
| 2002/0124148 A1 | 9/2002 | Beukema et al. |
| 2005/0193085 A1 | 9/2005 | Shimizu |

FOREIGN PATENT DOCUMENTS

| | | |
|---|---|---|
| JP | 57-189384 | 11/1982 |
| JP | 57-189384 A | 11/1982 |
| JP | 62-115554 | 5/1987 |
| JP | 62-115554 A | 5/1987 |
| JP | 4-130553 | 5/1992 |
| JP | 4-130553 A | 5/1992 |
| JP | 4-348442 | 12/1992 |
| JP | 4-348442 A | 12/1992 |
| JP | 2005-242598 | 9/2005 |
| JP | 2005-242598 A | 9/2005 |

OTHER PUBLICATIONS

Chinese Office Action dated Nov. 13, 2009, from the corresponding Chinese Application.

Translation of the International Search Report dated Apr. 17, 2007, from the corresponding International Application.

Supplementary European Search Report and Annex to the European Search Report, dated Jan. 30, 2009, for corresponding European Patent Application 07 70 6612.

"Address Translation Mechanism", IBM Technical Disclosure Bulletin, Apr. 1, 1991, pp. 398-399, vol. 33, No. 11, New York, U.S.

| IDENTIFICATION INFORMATION OF ACCESS SOURCE (IOID) | EFFECTIVE ADDRESS | PHYSICAL ADDRESS |
|---|---|---|
| . | . | . |
| . | . | . |
| ⋮ | ⋮ | ⋮ |

(SEGMENT NUMBER, PAGE NUMBER, IOID, OFFSET)

BRIDGE, PROCESSOR UNIT, INFORMATION PROCESSING APPARATUS, AND ACCESS CONTROL METHOD

This application is a national stage entry of PCT/JP2007/050265 filed Jan. 11, 2007 which claims priority to JP 2006-121900 filed Apr. 26, 2006 and JP 2006-105735 filed Apr. 6, 2006.

TECHNICAL FIELD

The present invention relates to a technique of accessing a processor unit from a peripheral device connected to the processor unit.

BACKGROUND ART

An information processing system is configured such that various types of peripheral devices are connected to a personal computer or server, via, for example, a PCI (Peripheral Component Interconnect) bus.

It is conceivable to employ the DMA (Direct Memory Access) architecture for accessing a memory of the processor from a peripheral device in order to reduce the load of the processor. By doing this, areas to be used by peripheral devices are respectively allocated in a memory area of the processor, so that the peripheral devices can directly access the areas respectively allocated thereto.

DISCLOSURE OF THE INVENTION

Problems to be Solved by the Invention

It is to be noted that once a DMAC (Direct memory Access Controller) of the processor is open to user software to enable the direct access from a peripheral device, malicious user software might access the area allocated to the peripheral device.

The present invention has been made in view of the above circumstances, and has a general purpose of providing a technique for ensuring the security while pursuing efficiency, when a peripheral device accesses a memory of a processor.

Means for Solving the Problems

An embodiment of the present invention is a bridge. This bridge relays an input/output bus of a processor unit to an input/output bus of a peripheral device, and includes an upstream port, an identification information converter, and a downstream port.

The upstream port receives from the peripheral device an access request packet adapted to designate an effective address of an area, in a memory of the processor unit, allocated to the peripheral device, the access request packet having device identification information by which the peripheral device can be uniquely identified.

The identification information converter acquires, from the device identification information included in the access request packet, verification information for verifying identification information of an access source defined to identify, in the processor unit, the access source permitted to access the effective address of the area, in the memory of the processor unit, allocated to each peripheral device, and which also acquires an access command including the verification information and the effective address designated by the access request packet. The downstream port passes the access command on to the processor unit that determines to permit access to the effective address, under the condition that the verification information included in the access command matches the identification information, in an address conversion table, of the access source corresponding to the effective address included in the access command, when the effective address is converted into a physical address by referring to the address conversion table for converting the effective address into the physical address, the address conversion table storing the effective address of the area, in the memory of the processor unit, allocated to each peripheral device and the identification information of the access source corresponding to the effective address in association with each other.

The memory in the processor unit is divided into a plurality of segments, each being further divided into a plurality of pages, and the address conversion table stores a combination of a segment number and a page number in association with the identification information of the access source, and the identification information converter associates one part of the device identification information with the identification information of the access source, and also associates another part of the device identification information with the segment number and the page number.

Another embodiment of the present invention is a processor unit. This processor unit is connected with a peripheral device by a bridge that relays an input/output bus of the peripheral device to an input/output bus of the processor unit.

The processor unit includes a memory and an address converter.

The address converter having an address conversion table for converting an effective address into a physical address, the address conversion table storing the effective address of an area, in the memory, allocated to each peripheral device, in association with identification information of an access source defined to identify, in the processor unit, the access source permitted to access the effective address. The address converter determines to permit access to the effective address under the condition that device identification information, which is included in an access command acquired from a bridge by converting an access request packet issued by the peripheral device and by which the peripheral device can be uniquely identified, matches the identification information of the access source corresponding to the effective address, in the address conversion table, included in the access command.

Optional combinations of the aforementioned constituting elements and implementations of the present invention in the form of methods, systems, computer programs, recording media with computer programs, etc. may also be implemented as additional modes of the present invention.

Advantageous Effects

According to the present invention, when a peripheral device connected to a processor unit accesses a memory of the processor unit, the security is ensured while efficiency is being pursued.

REFERENCE NUMERALS 10 processor unit, 14 address converter, 16 address conversion table, 18 address conversion table, 20 bridge, 30 peripheral device, 32 access request packet, 34 access request packet, 100 PCI device, 110 bridge, 112 first input/output unit, 114 bridge controller, 118 second input/output unit, 120 multicore processor, 130 SPE, 132 core, 134 local memory, 136 MFC, 138 DMAC, 140 PPE, 142 core, 144 cache, 145 cache, 146 MFC, 148 DMAC, 150 ring bus, 160 IOIF, 164 IO controller, 170 memory controller, 180 main memory, 200 node

BEST MODE FOR CARRYING OUT THE INVENTION

The outline of the technique proposed by the inventors of the present invention will be first described, before the detailed description of embodiments of the present invention is discussed.

Figure 1:
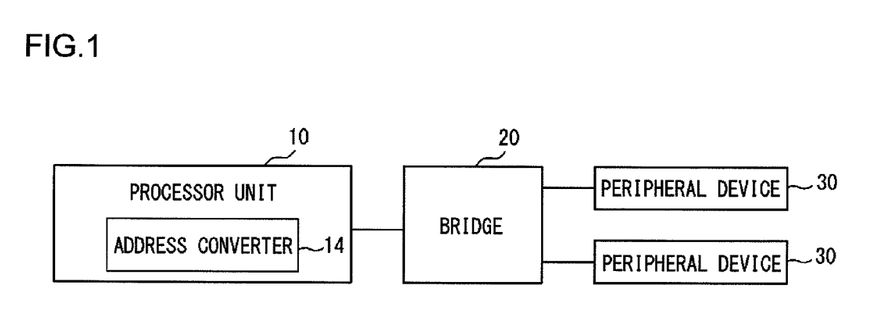
FIG. 1 illustrates an information processing system used in the description of the outline of the present invention.

An information processing system of FIG. 1 will now be considered. The information processing system includes a processor unit 10 and plural, herein, for example, two peripheral devices 30. The processor unit 10 and the peripheral device 30 are connected by a bridge 20. The processor unit 10 may be a single processor system having a single processor, or may be a multiprocessor system having plural processors. The processor unit 10 is provided with a memory, not shown, and if it is a multiprocessor system, the memory is a shared memory accessible from each processor. The processor unit 10 also includes an address converter 14, described later in detail.

Figure 2:
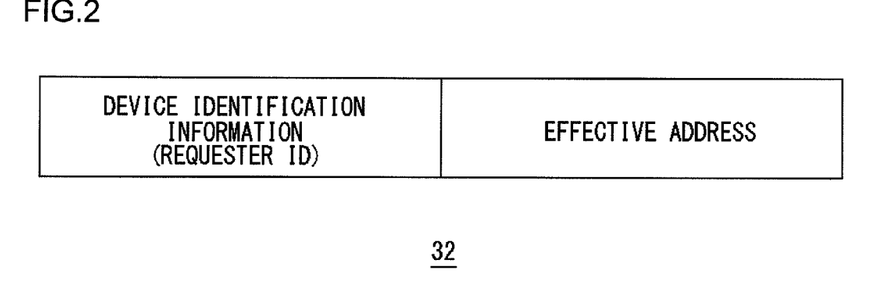
FIG. 2 illustrates an (first) example of an access request packet.

The peripheral device 30, when accessing the memory of the processor unit 10, issues an access request packet. An effective address in the memory area to be accessed by the peripheral device 30 can be designated by the access request packet, which includes device identification information on the peripheral device 30. FIG. 2 illustrates an example of an access request packet.

The effective address, described herein, is an address designating a given location in an effective address space. In addition, the effective address space means a space where parts of the memory space, which are partially extracted from the memory in the processor unit 10, are assembled and connected. The optimization of the internal configuration of the effective address space allows an application program that runs on the processor unit 10 to operate at the maximum performance.

An access request packet 32 of FIG. 2 includes device identification information and an effective address. The device identification information denotes information that can uniquely identify the peripheral device 30 in the information processing system of FIG. 1. For example, the device identification information can be the information that represents the physical location of the peripheral device such as a bus number of a bus to which the peripheral device is connected, or can be the information that represents the type of the peripheral device. Also, a graphics processor or a high-speed memory device is possibly connected as a peripheral device in order to enhance the function of the information processing system or improve the performance thereof. Under the circumstances where the connection of more peripheral devices is demanded, switches in plural stages are connected next to the bridge in some cases so as to construct a network composed of devices. In such a case, the device identification information includes a switch number. Hereinafter, the device identification information will be referred to as requester ID, for brevity.

The address converter 14 of the processor unit 10 converts the effective address included in the access request packet 32 into the physical address of the memory, thereby allowing the peripheral device 30 that has issued an access request packet to access the memory. The address converter 14 will now be discussed.

Figure 3:
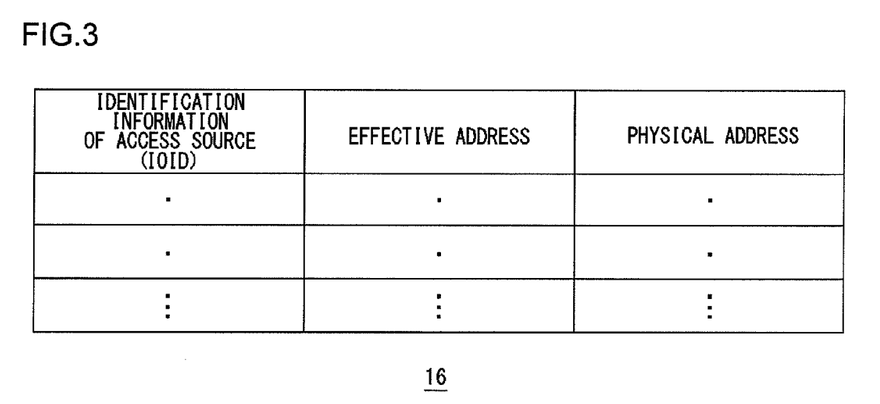
FIG. 3 illustrates an (first) example of an address conversion table for converting an effective address into a physical address.

The address converter 14 converts the address using an address conversion table 16 of FIG. 3.

Areas in the memory of the processor unit 10 are respectively allocated for the peripheral devices 30. The address conversion table 16 stores access source identification information (hereinafter, referred to as IOID) that identifies an access source permitted to access the area allocated thereto, in the processor unit 10, an effective address corresponding to the above allocated area and representing an area in an effective address space (hereinafter, referred to as effective area) and a physical address representing the area in a physical address space (hereinafter, referred to as physical area) in association with each other. In this case, a single IOID corresponds to one or more effective addresses.

The address converter 14, when converting the effective address included in the access request packet 32 into the physical address, firstly conducts verification of a requester ID included in the access request packet 32 and the IOID included in the address conversion table 16. Specifically, the IOID, which is included in the address conversion table 16 and which corresponds to the effective address included in the access request packet 32, is verified whether it matches the requester ID. As a result of the verification, when the IOID matches the requester ID, the access is allowed and the effective address thereof is converted into the physical address. When the IOID does not match the requester ID, an error is returned and the access is denied.

This permits direct access from a peripheral device 30 to the area in the memory of the processor unit 10, allocated to the peripheral device 30. At the same time, this prevents the peripheral device 30 from accessing an area other than the allocated one, thereby preventing a malicious device or user software from accessing the memory area allocated to the peripheral device 30 and ensuring the security thereof, even if the DMAC, not shown in the processor unit 10, is open to the user software.

Meanwhile, an input/output bus of the processor unit has a specification different from that of the peripheral device, in many cases. For this reason, a bridge is employed to relay the input/output bus of the peripheral device to the input/output bus of the processor unit. In such a case, the number of the bits of the requester ID is generally different from the number of the bits of the IOID, because of the restrictions imposed by regulations. If the number of the bits of the IOID is smaller than the number of the bits of the requester ID, a problem will occur.

So, instead of comparing the requester ID with the IOID directly, the bridge sets the requester ID so that the number of the bits of the requester ID matches the number of the bits of the IOID, and then the requester ID and the IOID are compared accordingly. This also allows the protection of the memory by means of the IOID.

For this purpose, the inventors of the present invention propose the following technique.

A description will be given, also with reference to the information processing system of FIG. 1.

Figure 4:
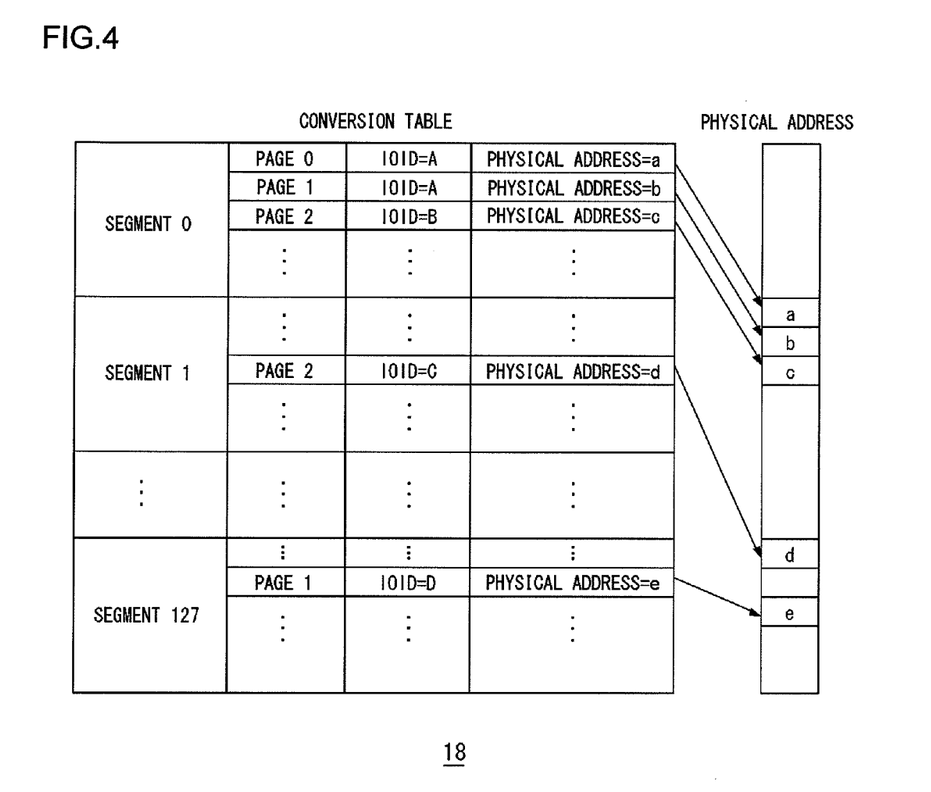
FIG. 4 illustrates an (second) example of the address conversion table for converting the effective address into the physical address.

In this case, the address converter 14 of the processor unit 10 uses an address conversion table 18 shown in FIG. 4. As depicted in the figure, the IOIDs are stored in association with combinations of a segment number and a page number, respectively.

The memory of the processor unit 10 is divided into segments and each of the segments is further divided into plural pages. The combination of the segment number and the page number denotes the effective area.

In the address conversion table 18, the physical address is mapped to each page included in the segment and access permit or access deny is shown based upon the IOID.

Figure 5:
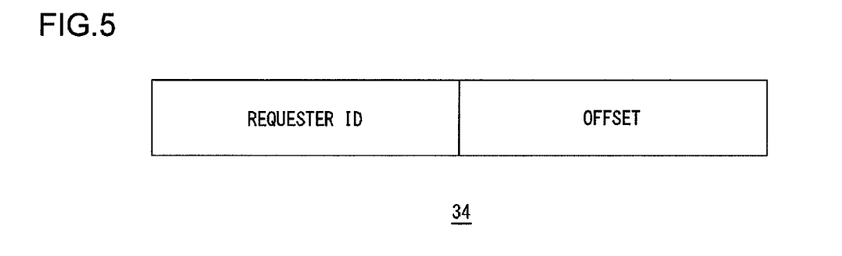
FIG. 5 illustrates an (second) example of the access request packet.

FIG. 5 illustrates an example of the access request packet issued by the peripheral device 30 in the above case. An access request packet 34 of this example includes the requester ID and the offset in a memory area to be accessed.

The bridge 20 converts the access request packet 34 into an access command including the IOID and the effective address. Specifically, one part of the requester ID included in the access request packet 34, for example, the lower bits of the requester ID, equal in number to the number of bits in an IOIO, is associated with the IOID, and another part of the requester ID, for example, the upper bits thereof are associated with the segment number and the page number, respectively.

Figure 6:
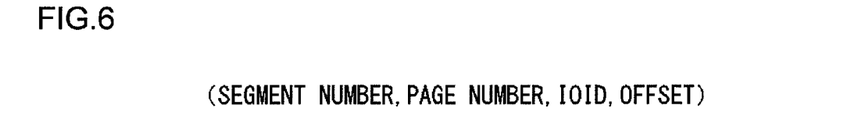
FIG. 6 illustrates an access command acquired by converting the access request packet.

FIG. 6 illustrates an access command created by the bridge 20. The access command includes: the segment number; the page number; the IOID; and the offset.

The address converter 14 of the processor unit 10, when converting into the physical address the effective address included in the access command (the combination of the segment number; page number; and offset, in this case) given by the bridge 20, firstly verifies the IOID included in the access command with the IOID in the address conversion table 18. Specifically, the IOID associated with the combination of the segment number and page number included in the access command in the address conversion table 18 is verified whether or not it matches the IOID included in the access command. When a match occurs as a result of the verification, the access is allowed and the effective address included in the access command is converted into the corresponding physical address. When the IOIDs do not match, an error is returned and the access is denied.

By employing the above method, the memory can be protected by using the IOID, even in a case where the number of the bits of the requester ID of the peripheral device is greater than the number of the bits of the IOID used by the address converter 14 of the processor unit 10.

A description will hereinafter be given of a system that embodies the above outline, according to an embodiment of the present invention.

Figure 7:
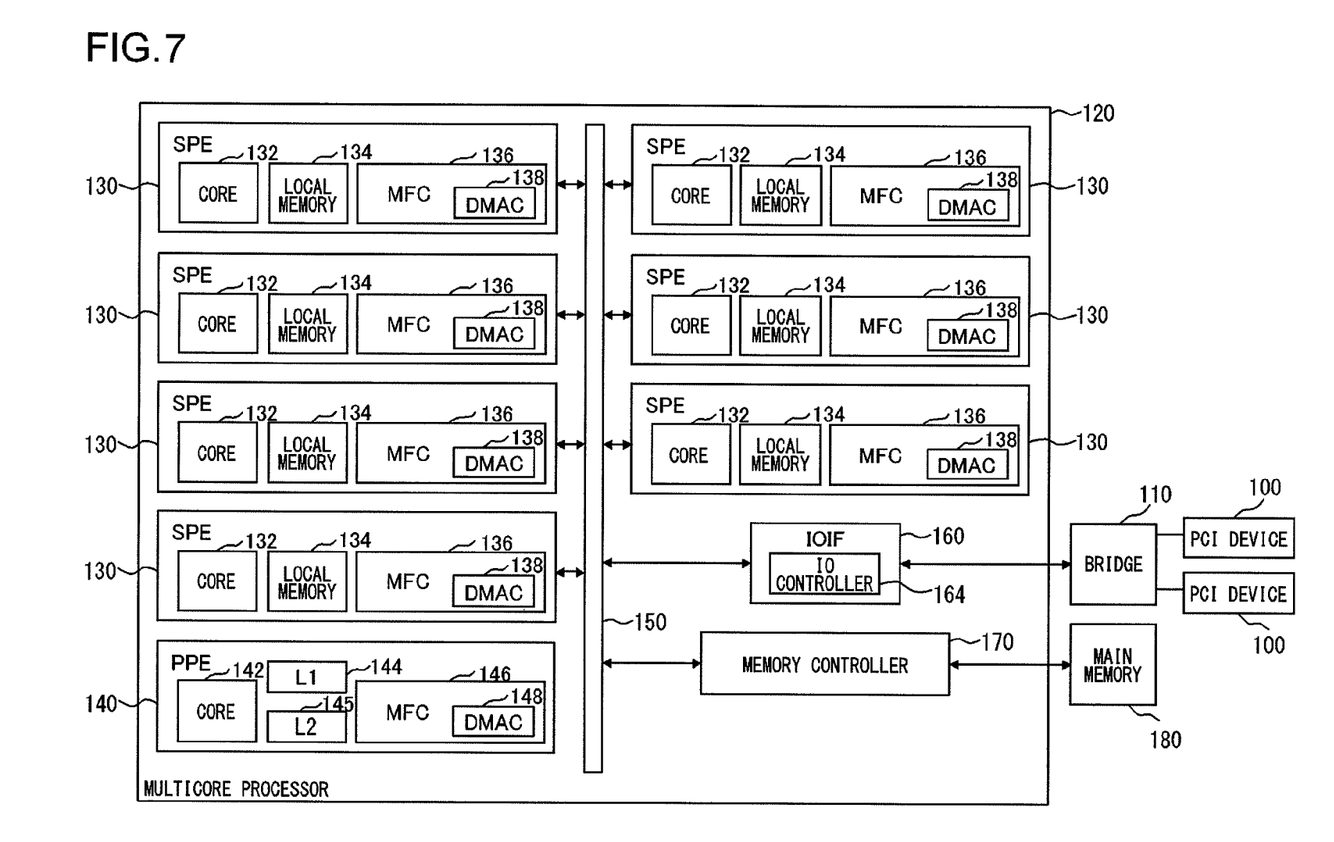
FIG. 7 illustrates an information processing system according to an embodiment of the present invention.

FIG. 7 illustrates a configuration of an information processing system according to an embodiment of the present invention. The information processing system includes: plural peripheral devices, for example, plural PCI devices 100; a multicore processor 120; a main memory 180; and a bridge 110 connecting PCI devices 100 and the multicore processor 120. The multicore processor 120 and the main memory 180 constitute a single processor unit.

A PCI bus is employed as a connection interface of the PCI device 100. The PCI bus may employ any one of specifications including PCI, PCIX, and PCI Express®.

The multicore processor 120 is made of a single chip including: a main processing unit PPE (Power Processing Element) 140; plural, for example, eight in the figure, sub processing units SPEs (Synergistic Processing Elements) 130; an I/O interface (hereinafter, referred to as IOIF) 160; and a memory controller 170, which are connected with each other by a ring bus 150.

The main memory 180 is a shared memory of the processing units in the multicore processor 120, and is connected to the memory controller 170. The main memory 180 is divided into plural segments, and each of the segments is further divided into plural pages.

The memory controller 170 mediates the access to the main memory 180 from the PPE 140 and the SPEs 130, respectively. The main memory 180 is provided outside the multicore processor 120 in the example of FIG. 7, but may be included in the multicore processor 120.

The IOIF 160 is connected to the bridge 110 by an IOIF bus, not shown, and operates in cooperation with the bridge 110, thereby allowing the access to the main memory 180 from the PCI device 100. The IOIF 160 has an I/O controller 164 therein.

Each SPE 130 is provided with: a core 132; a local memory 134; a memory flow controller (hereinafter, referred to as MFC) 136. The MFC 136 has a DMAC (Direct Memory Access Controller) 138 therein. Preferably, the local memory 134 is not a conventional hardware cache memory, and does not include any of a hardware cache circuit, a cache register, and a cache memory controller to fulfill the hardware cache memory function, each being located inside or outside the chip.

The PPE 140 is provided with: a core 142; an L1 cache 144; an L2 cache 145; and an MFC 146. The MFC 146 has a DMAC 148 therein.

In general, the operating system (hereinafter, referred to as OS) of the multicore processor 120 operates on the PPE 140, and a program operating on each SPE 130 is determined according to the basic processing of the OS. The program that runs on the SPE 130 may be a program that plays a part of the functions of the OS (such as a device driver or a part of a system program). Instruction sets are different between the instruction set architecture of the PPE 140 and that of the SPE 130.

At the time of initialization of the information processing system of FIG. 7, the device driver of the multicore processor 120 searches for a device and acquires the requester ID of each PCI device 100. In the above example, the number of the bits of the requester ID is determined to be, for example, 16 by the PCI standards. This allows the OS of the multicore processor 120 to acquire the segment available for each PCI device 100 and the IOID thereof. It is assumed that 11 bits are assigned to an IOID according to the specification of the multicore processor 120, so the OS acquires, for example, the lower 11 bits of the requester ID as an IOID.

Then, the OS creates a page entry for the segment in response to a memory allocation request to allocate for the PCI device 100. The page size can be selected in this process. The address conversion table 18 of FIG. 4 is generated by the memory allocation. The OS stores the address conversion table 18 in the main memory 180, thereby allowing the PCI device 100 to access the main memory 180.

The PCI device 100 issues an access request packet to access the main memory 180. The access request packet 34 of FIG. 5 is used as an access request packet in this process.

Figure 8:
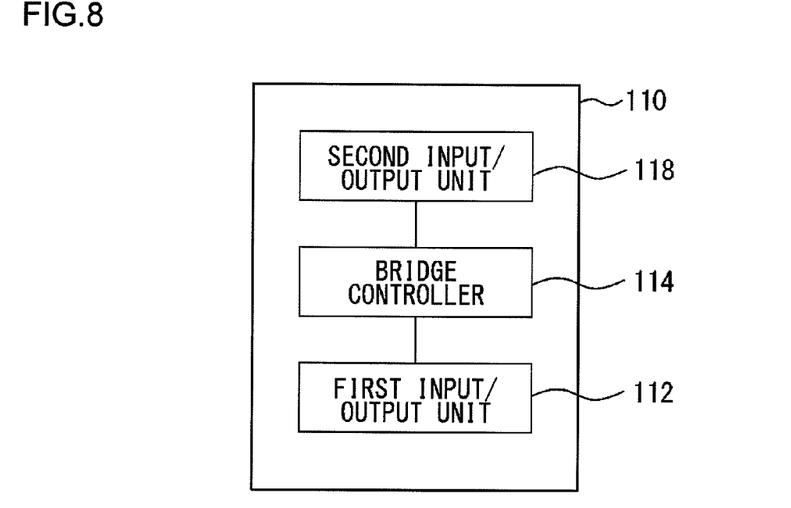
FIG. 8 illustrates a system configuration of a bridge in the information processing system of FIG. 7.

FIG. 8 illustrates a configuration of the bridge 110. The bridge 110 includes: a first input/output unit 112; a bridge controller 114; and a second input/output unit 118.

A first input/output unit 112 receives the access request packet issued by the PCI device 100, and a bridge controller 114 converts the received access request packet into an access command. Subsequently, a second input/output unit 118 passes the access command on to the IOIF 160 of the multi-core processor 120.

The bridge controller 114 acquires the lower 11 bits of the requester ID of the PCI device 100 included in the access request packet, and associates, for example, the upper 5 bits of the requester ID with the segment number and the page number. By the above conversion, the access command of FIG. 6 is obtained.

The IO controller 164 of the IOIF 160 refers to the address conversion table 18 of FIG. 4, and converts an effective address (the combination of the segment number, the page number, and the offset) included in the access command passed by the bridge 110, into a physical address in the main memory 180. If the page size is 4 KB, the access command composed of 36 bits is defined as follows: [34:28]=segment; [27:12]=page; and address [11:0]=offset.

For the conversion, the IO controller 164 firstly refers to the conversion table by using the segment number and the page number included in the access command as keys to learn whether or not the access is permitted. For example, in the case where "C" is the IOID received together with the access command representing that "the segment is 1, the page is 2, and the offset is 0", the IO controller 164 permits access to a physical address "d" corresponding to "the segment 1 and the page 2", because the address conversion table 18 associates IOID=C with "segment=1, page=2" to permit access. Meanwhile, in the case where "C" is the IOID received together with the access command representing that "the segment is 127, the page is 1, and the offset is 0", the IO controller 164 returns an error signal to deny the access, because the address conversion table 18 associates IOID=D with "segment=127, page=1" to permit access.

The description of the invention given above is based upon an embodiment. The embodiment is illustrative in nature and various variations in constituting elements and processes involved are possible. Those skilled in the art would readily appreciate that such variations are also within the scope of the present invention.

For example, the PCI device 100 is described as a peripheral device in the information processing system of FIG. 7. However, there may be employed any other peripheral device that complies with any standard other than the PCI standards.

Figure 9:
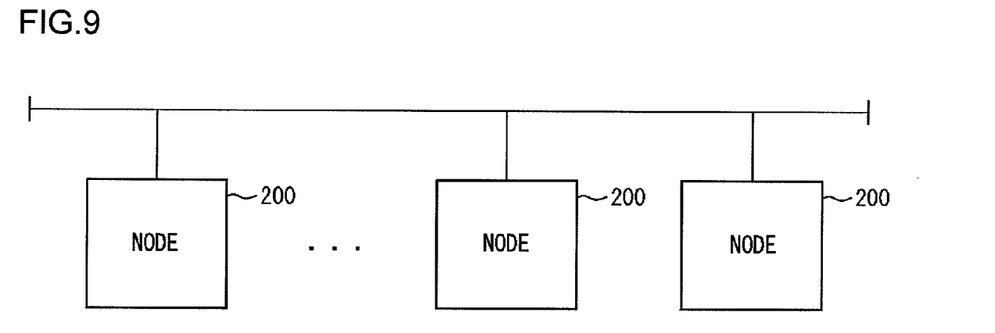
FIG. 9 illustrates a distributed application system to which the technical concept of the present invention is applicable.

In addition, the technical concept of the present invention is applicable to a distributed application system in which plural nodes on the network can execute identical applications in parallel, and the device identification information is replaced with the application identification information, so that the identical applications running on different nodes can access one another and the memory spaces respectively allocated to the identical applications on the different nodes can be protected. Specifically, each of the nodes 200 is provided with a processor unit and a memory in the distributed application system of FIG. 9. The application identification information, by which the application can be uniquely identified, is given to each of the running applications, and in addition, an area in a memory of each node 200 that can be used by the application is allocated to each of the running applications. When one of the nodes 200 accesses another node 200, the application identification information is added to the access request packet. When the effective address included in the access request packet is converted into the physical address, in the access target node 200, whether or not the access to the effective address is permitted is determined based upon the application identification information. This allows each of the identical applications running on the different nodes on the network to access each of the areas on the other nodes respectively allocated to the identical applications, and also prevents a different application from accessing the areas respectively allocated to the aforementioned identical applications.

INDUSTRIAL APPLICABILITY

The present invention can be applied to a technique of accessing a memory in a processor from a peripheral device.

The invention claimed is:

1. An information processing apparatus in which a processor unit is connected with a peripheral device, wherein:
    the processor unit and the peripheral device are connected by a bridge, which relays an input and output bus of at least one peripheral device of a plurality of peripheral devices to an input and output bus of the processor unit by use of an upstream port and a downstream port,
    the processor unit includes an address converter having an address conversion table for converting an effective address into a physical address, the address conversion table storing the effective address of an area, in a memory of the processor unit, allocated to each peripheral device, in association with identification information defined to identify, in the processor unit, a peripheral device permitted to access the effective address,
    the peripheral device issues an access request packet, which designates the effective address corresponding to the peripheral device, when accessing the memory, the access request packet including device identification information by which the peripheral device can be uniquely identified and containing a number of bits larger than the bit length of the identification information stored in the address conversion table,
    the bridge acquires an access command from the access request packet such that the bridge acquires verification information from the device identification information and the effective address, the verification information having of a bit length that matches the bit length of the identification information and includes the verification information in the access command, and
    the address converter determines whether to permit access to the effective address under the condition that the verification information included in the access command matches the identification information included in the address conversion table and corresponding to the effective address designated by the access command.

2. The information processing apparatus according to claim 1, wherein:
    the memory in the processor unit is divided into a plurality of segments, each being further divided into a plurality of pages,
    the address conversion table stores a combination of a segment number and a page number in association with the identification information, and
    the bridge associates one part of the device identification information with the verification information, and also associates another part of the device identification information with the segment number and the page number.

3. A bridge, which relays an input and output bus of a peripheral device to an input and output bus of a processor unit, comprising:
- an upstream port, which receives from the peripheral device an access request packet that designates an effective address of an area, in a memory of the processor unit, allocated to the peripheral device, the access request packet having device identification information by which the peripheral device can be uniquely identified and containing a number of bits larger than the bit length of identification information defined to identify, in the processor unit, the peripheral device permitted to access the effective address of the area in the memory of the processor unit allocated to each peripheral device;
- an identification information converter which acquires from the device identification information included in the access request packet, verification information, and which also acquires an access command including the verification information and the effective address designated by the access request packet;
- a downstream port which passes the access command on to the processor unit that determines whether to permit access to the effective address, under the condition that the verification information, of a bit length that matches the bit length of the identification information, included in the access command matches the identification information, in an address conversion table, of corresponding to the effective address included in the access command, when the effective address is converted into a physical address by referring to the address conversion table for converting the effective address into the physical address, the address conversion table storing the effective address of the area, in the memory of the processor unit, allocated to each peripheral device and the identification information of the peripheral device corresponding to the effective address in association with each other.

4. The bridge according to claim 3, wherein:
the memory in the processor unit is divided into a plurality of segments, each being further divided into a plurality of pages,
the address conversion table stores a combination of a segment number and a page number in association with the identification information, and
one part of the device identification information is associated with the verification information, and another part of the device identification information is also associated with the segment number and the page number, so as to acquire the access command.

5. A processor unit connected with an input and output bus of at least one peripheral device of a plurality of peripheral devices by a bridge, which relays to an input and output bus of the processor unit by use of an upstream port and a downstream port, comprising:
- a memory; and
- an address converter having an address conversion table for converting an effective address into a physical address, the address conversion table storing the effective address of an area, in the memory, allocated to each peripheral device, in association with identification information defined to identify, in the processor unit, a peripheral device permitted to access the effective address,
the peripheral device issues an access request packet, which designates the effective address corresponding to the peripheral device, when accessing the memory, the access request packet including device identification information by which the peripheral device can be uniquely identified and containing a number of bits larger than the bit length of the identification information stored in the address conversion table,
wherein the address converter determines whether to permit access to the effective address under the condition that verification information which is included in an access command acquired from the bridge by converting the access request packet issued by the peripheral device, matches the identification information corresponding to the effective address, stored in the address conversion table;
the verification information having a bit length that matches the bit length of the identification information stored in the address conversion table.

6. The processor unit according to claim 5, wherein:
the memory in the processor unit is divided into a plurality of segments, each being further divided into a plurality of pages,
the address conversion table stores a combination of a segment number and a page number in association with the identification information, and
the access command is acquired such that the bridge acquires verification information for verifying one part of the device identification information with the verification information, and also acquires another part of the device identification information to correspond to a segment number and a page number.

7. An access control method in an information processing apparatus in which a processor unit is connected with a peripheral device by a bridge, which relays an input and output bus of the peripheral device to an input and output bus of the processor unit by use of an upstream port and a downstream port, comprising:
receiving from the peripheral device, an access request packet designating an effective address of an area, in a memory of the processor unit, allocated to the peripheral device, the access request packet including device identification information by which the peripheral device can be uniquely identified and containing a number of bits larger than the bit length of identification information;
acquiring by the bridge an access command from the access request packet such that the bridge acquires verification information from the device identification information and the effective address, the verification information having a bit length that matches the bit length of the identification information and includes the verification information in the access command; and
referring to an address conversion table, which converts the effective address into the physical address and which stores the effective address of the area in the memory of the processor unit, allocated to each peripheral device, in association with the identification information defined to identify, in the processor unit, the peripheral device permitted to access the effective address, so as to determine whether to permit access to the effective address under the condition that the verification information included in the access command matches the identification information corresponding to the effective address, in the address conversion table, designated by the access command.

8. The access control method according to claim 7, wherein:
the memory in the processor unit is divided into a plurality of segments, each being further divided into a plurality of pages, the address conversion table stores a combination of a segment number and a page number in association with the identification information, and the associating the device identification information with the identification information of the access source is associating one part of the device identification information with the verification information and also associating another part of the device identification information with the segment number and the page number.

* * * * *